United States Patent Office 2,819,630
Patented Jan. 14, 1958

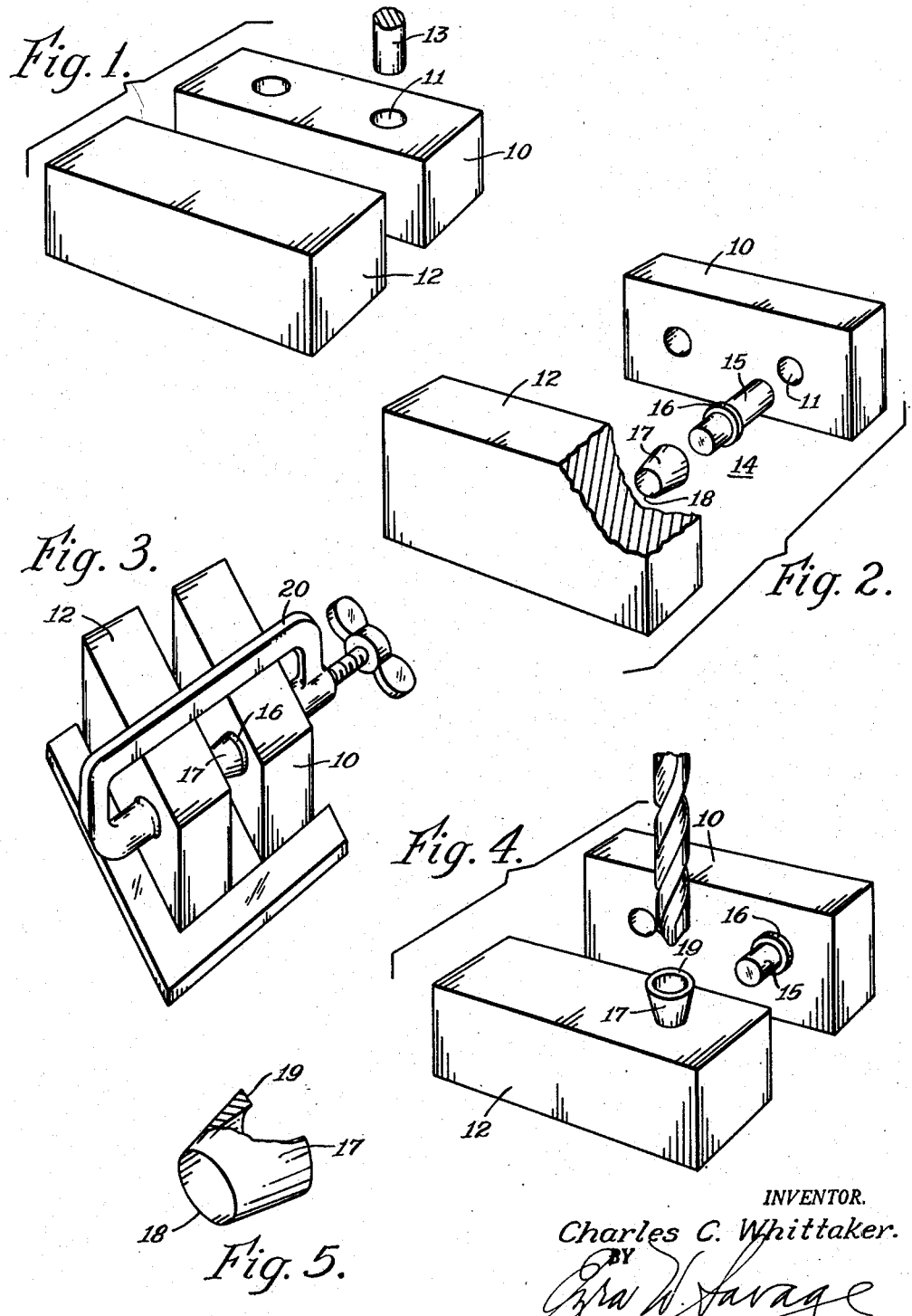

2,819,630
GUIDE AND MARKER FOR DRILLING DOWEL PIN HOLES

Charles C. Whittaker, Pittsburgh, Pa.

Application November 23, 1954, Serial No. 470,778

5 Claims. (Cl. 77—55)

The invention relates to a guide and marker for use in the drilling of matching dowel pin holes for joining members with concealed dowel pins.

In woodworking and similar arts many expedients have been employed for drilling matching dowel pin holes in order to so join members with concealed dowel pins that they present aligned surfaces. A well known practice is to provide a pin having a sharp end for mounting in a drilled dowel pin hole in one member, and utilizing the pin for marking another member which has been properly aligned with the first member. The marking is effected by pressing the two aligned members toward one another.

It is well known that when such pins are employed for marking wood that the fibers of the wood may deflect the sharp point slightly. Therefore, when the dowel pin hole is drilled in the marked member, it will not be so located that the two members will be in the exact predetermined positions intended. Even when the marking is fairly accurate, the fibers of the wood may cause a deflection of the drill so that the dowel pin hole is not drilled with accuracy.

The object of the present invention is to provide for the accurate marking and drilling of matching dowel pin holes in pieces of material that are to be joined by concealed dowel pins.

It is also an object of the invention to provide a guide and marker for the marking of locations for the drilling of matching dowel pin holes which will not be deflected by the fibers of wood or other material and which will guide the drill during a drilling operation and maintain it in the position necessary for the drilling of an accurately located dowel pin hole.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention, reference should be had to the following detailed description taken in connection with the accompanying drawing, in which:

Figure 1 is a view in perspective of two members and a portion of a dowel pin which will be referred to for illustrating the application of the invention, Fig. 2 is an exploded view in perspective showing the members illustrated in Fig. 1, in combination with a dowel pin guide and marker constructed in accordance with the teachings of this invention, Fig. 3 is a view in perspective showing the members illustrated in Fig. 2 aligned and clamped together to show the functioning of the dowel pin guide and marker, Fig. 4 is a view in perspective showing a dowel pin guide and marker constructed in accordance with the invention as it is applied to perform its function, and Fig. 5 is a view in perspective of the guide and marking member with a portion cut away to show its construction.

Referring now to the drawing and Fig. 1 in particular, two blocks which it is desired to unite by concealed dowel pins are illustrated in order to facilitate a description of the construction and function of the invention. These blocks may be wood or any other material that it is desired to join by concealed dowel pins. The block 10 has two dowel pin holes 11 drilled therein and it is desired to unite it with block 12 by concealed dowel pins. Disposed above the block is a portion of a dowel pin 13 which is of the proper diameter to fit snugly into the dowel pin hole 11.

In Fig. 2 the dowel pin marker and guide shown generally at 14 is shown in perspective disposed between the blocks 10 and 12. The dowel pin guide and marker comprises a pin 15 of predetermined diameter and length adapting it to fit in the dowel pin hole 11 snugly. This means that generally the pin 15 will be of substantially the same diameter as the dowel pin 13.

A flange 16 encircles the pin 15 along a line located a predetermined distance from the ends of the pin. The flange may be a ring fastened to the pin in any suitable manner such as by welding or brazing or as is more generally the practice, the flange may be formed by machining cylindrical bar stock to the right diameter leaving a flange at a predetermined location on the pin. The depth of the flange or the distance that it extends outwardly from the pin may vary appreciably depending on the purpose for which the dowel pin guide and marker is designed. Generally, a flange having a depth of about ¼ of the diameter of the pin is adequate.

A tubular member 17 having an inside diameter only slightly larger than the outside diameter of the pin 15 is utilized in conjunction with the pin. The tubular member may be made from a metal tube having a thickness about equal to the depth of the flange 16. Since the inside diameter of the tubular member is only slightly larger than the outside diameter of the pin 15, it will fit snugly thereon.

A circular cutting edge 18 is provided on the tubular member 17. This cutting edge may be just a sharp edge provided on the leading end of the tubular member 17. The cutting edge should be sharp enough to readily cut into the material to be marked when subjected to a reasonable pressure.

A very satisfactory cutting edge has been provided on the tubular member 17 by so machining the tubular stock from which it is made that the outer surface of the tubular member 17 will conform to the surface of a conic frustum. When the tubular member 17 is machined in this manner, the base 19 will have a thickness about equal to the depth of the flange 16 and it will seat firmly on the latter. The cutting edge 18 will be brought to substantially the sharpness of a knife edge so that it will readily mark and cut into the wood or other material to be marked.

Referring now to Fig. 2, the pin presents two portions on opposite sides of the flange 16. In this particular modification of the invention the longer end of the pin 15 is provided for fitting snugly into the dowel pin hole 11 while the shorter or upper end of the pin is provided for receiving the tubular member 17. As pointed out hereinbefore, the tubular member 17 fits snugly on the pin but is loose enough to permit it to be readily withdrawn. The end of the pin 15 which receives the tubular member 17 will be shorter than the tubular member so that an unobstructed cutting edge is presented. Further, the end of the pin on which the tubular member is mounted will serve as a stop to limit the depth to which the tubular member 17 may cut into the wood or other material to be marked.

In operation, one of the members to be united by concealed dowel pins will have one or more dowel pin holes of a predetermined diameter drilled therein, as shown in Figs. 1 and 2. The dowel pin guide and marking set will then be disposed in the member having the dowel pin hole 11. A set having a pin 15 of a predetermined size to match the dowel pin hole 11 will be selected. The pin will then be inserted into the dowel pin hole 11 and pushed home as shown in Fig. 4. In this position the flange 16 seats on the surface of the member 10. The tubular member 17 will then be seated on the outer end of the pin 15. The members 10 and 12 are now ready to be so aligned that the member 12 may be marked and have the tubular member 17 set therein in a predetermined position. A simple illustration is shown in Fig. 3. However, it will readily be appreciated that structures of all shapes and sizes may be aligned by methods familiar to those skilled in the art. It may be necessary to prepare jigs of different kinds to properly align the members but this is a well known practice.

In the showing in Fig. 3, a carpenter's square or try square is employed and the two blocks 10 and 12 are disposed in proper alignment. They are then moved toward one another until the cutting edge 18 of the tubular member 17 contacts the member 12. Pressure may be applied in any suitable manner and in this embodiment of the invention a clamp 20 is applied to the members 10 and 12 and disposed in alignment with the dowel pin guide and marking set. On the application of pressure the cutting edge 18 of the tubular member enters the member 12 making a circular marking and partially embedding itself in the material. After the marker is set, clamp 20 may be removed and the member 10 withdrawn. Since the tubular member 17 fits loosely on the pin 15, the latter may be withdrawn without disturbing the set tubular member 17. The arrangement of the members when the pin is withdrawn is best shown in Fig. 4.

If the members 10 and 12 are of wood, the cutting edge of the tubular member 17 will cut across the fibers of the wood and embed itself in the wood. Since the cutting edge 18 cuts across the fibers, it will not be deflected but will make a mark in the exact location. If the member 17 is removed from a block after it is set, as shown in Fig. 4, you will find that the location for the drilling of the matching dowel pin hole will be definitely shown by a ring shaped mark.

If for any reason it is necessary to remove the tubular member 17, it can be readily replaced and firmly located in position by tapping it lightly. When the drilling operation is to be performed, a drill of the proper diameter to snugly fit into the tubular member 17 is selected. The member 12 will be moved on the stand provided on the drilling machine until it aligns accurately with the drill. When the drill is moved downwardly, it enters the guide and when it reaches the wood or other material, it will drill the dowel pin hole in an exact matching position. The further the drill enters the tubular member, the greater the resistance the tubular member will offer to lateral movement of the drill, and so the drill is guided with exact accuracy and firmness.

Dowel pins are made and sold to the trade in standard sizes. Usually there are not more than about 4 or 5 sizes of dowel pins used in furniture or cabinet work. In order to meet the requirements of the trade, guide and marking sets, such as described hereinbefore, will be made in 4 or 5 sizes and sold in sets.

Since certain changes may be made in the above article, and different embodiments of the invention could be made without departing from the scope therefore, it is intended that all matter contained in the above description or shown in the accompanying drawing shall be interpreted as illustrative and not in a limiting sense.

Having described my invention, what I claim as new and desire to secure by Letters Patent is:

1. In a guide and marker for use in drilling in a second member a dowel pin hole to match a dowel pin hole in a first member comprising a flanged pin which fits the dowel pin hole in the first member, the flange on the pin being at a distance from the opposite ends of the pin, the flange being large enough to seat on the surface of the first member to support the outer end of the pin a predetermined distance above the surface of the first member, a tubular member for removably mounting on the flanged pin, the tubular member having an inside diameter substantially the diameter of the dowel pin hole in the first member, and a circular cutting edge provided on the outer end of the tubular member whereby when the tubular member is pressed into engagement with the second member it cuts into and adheres to it when the pin is withdrawn.

2. In a guide and marker for use in drilling in a second member a dowel pin hole to match a dowel pin hole in a first member comprising a pin for mounting in the dowel pin hole in said first member, a flange for supporting the pin in the dowel pin hole, the pin being disposed a distance from the opposite ends of the pin, the flange being large enough to seat on the surface of the first member around the dowel pin hole to support the pin a predetermined distance above the surface of the first member, a tubular member having an inside diameter substantially the diameter of the dowel pin hole in the first member for removably mounting on the outer end of the pin, and a cutting edge provided on the outer end of the tubular member, the portion of the flanged pin for receiving the tubular member being shorter than the tubular member to permit the cutting edge to cut into the second member to be drilled whereby it adheres to the second member to mark it and serve as a guide for a drilling operation.

3. In a guide and marker for use in drilling in a second member a dowel pin hole to match a dowel pin hole in a first member comprising a pin of the right size to fit a dowel pin hole, a flange encircling the pin to serve as a support, the flange being large enough to seat on the surface of a member in which a dowel pin hole has been drilled, the flange being a predetermined distance from the ends of the pin, a tubular member having an inside diameter substantially that of the dowel pin hole to enable it to be removably mounted on the outer end of the pin, and a cutting edge provided on the outer end of the tubular member, the distance from the flange to the outer end of the pin being less than the length of the tubular member whereby the cutting edge of the tubular member may be forced into the second member a predetermined distance to effect a marking and causing the tubular member to adhere to the second member to serve as a guide in the drilling operation.

4. In a guide and marker for use in drilling dowel pin holes, in combination a pin of predetermined size for fitting a dowel pin hole, a flange encircling the pin a predetermined distance from the ends, a tubular member having an inside diameter substantially equal to the diameter of the pin to permit the removable mounting of the tubular member on the pin, and a cutting edge provided on one end of the tubular member.

5. In a guide and marker for use in drilling dowel pin holes, in combination a pin of predetermined diameter adapting it for fitting in a dowel pin hole, a flange encircling the pin at a predetermined distance from the ends of the pin, the flange extending outwardly from the pin a sufficient distance to limit the extent to which the pin may be inserted in a dowel pin hole, a tubular member having an inside diameter only slightly larger than the diameter of the pin to permit it to be removably mounted on one end of the pin, the tubular member being of a substantial thickness at one end, the outer surface of the tubular member being shaped to conform to the shell of a conic frustum shaping the other end of the tubular member into a circular cutting edge, the tubular member being longer than the distance from the flange to one end of the pin.

References Cited in the file of this patent

UNITED STATES PATENTS

| | | |
|---|---|---|
| 1,976,776 | Gookin | Oct. 16, 1934 |
| 2,408,595 | Beard | Oct. 1, 1946 |
| 2,675,625 | Rayl | Apr. 20, 1954 |

FOREIGN PATENTS

| | | |
|---|---|---|
| 154,073 | Great Britain | Nov. 25, 1920 |